United States Patent
Leadbeater et al.

(10) Patent No.: US 8,795,751 B2
(45) Date of Patent: Aug. 5, 2014

(54) MOULDING OF CHOCOLATE

(75) Inventors: John Michael Leadbeater, York (GB); Nicolas Christian Mickael Gomes, Villars-sur-Glane (CH); Mikael Rota, Beauvais (FR); Thierry Denis Fiaux, Corsier sur Vevey (CH); Patrick Couzens, Aigle (CH)

(73) Assignee: Nestec S.A., Vevey (CH)

( * ) Notice: Subject to any disclaimer, the term of this patent is extended or adjusted under 35 U.S.C. 154(b) by 720 days.

(21) Appl. No.: 12/991,604

(22) PCT Filed: May 6, 2009

(86) PCT No.: PCT/EP2009/003237
§ 371 (c)(1),
(2), (4) Date: May 6, 2011

(87) PCT Pub. No.: WO2009/135661
PCT Pub. Date: Nov. 12, 2009

(65) Prior Publication Data
US 2011/0262598 A1 Oct. 27, 2011

(30) Foreign Application Priority Data
May 8, 2008 (GB) .................. 0808335.4

(51) Int. Cl.
*A23G 1/28* (2006.01)
(52) U.S. Cl.
USPC ............... 426/389; 249/136; 249/142; 425/3; 425/112; 425/438; 425/439; 426/512
(58) Field of Classification Search
CPC .............. A23G 1/0076; A23G 1/0096
USPC ....... 425/3, 112, 438, 439, DIG. 33; 249/136, 249/142; 426/389, 512
See application file for complete search history.

(56) References Cited

U.S. PATENT DOCUMENTS

| | | | | |
|---|---|---|---|---|
| 577,781 A | * | 2/1897 | Pike | 249/57 |
| 805,418 A | * | 11/1905 | Frost | 249/64 |
| 1,899,708 A | * | 2/1933 | Miller | 425/553 |

(Continued)

FOREIGN PATENT DOCUMENTS

| DE | 10305299 | 10/2004 |
|---|---|---|
| DE | 10305301 | 10/2004 |

(Continued)

OTHER PUBLICATIONS

PCT International Search Report for International Application No. PCT/EP2009/003237 with a date of mailing of Sep. 2, 2009.

*Primary Examiner* — Robert B Davis
(74) *Attorney, Agent, or Firm* — K&L Gates LLP

(57) ABSTRACT

An apparatus and method for the manufacture of a chocolate piece or tablet having a core or cavity passing through the thickness of the piece or tablet which comprises a mold (10) comprising a surrounding wall (11) and base (12), a central aperture having a predetermined cross-sectional shape passing through the base, and a former (14) having a cross-sectional shape conforming to that of the central aperture adapted to reciprocate through the central aperture between a retracted position where its upper surface is level with the base (12) of the mold to an advanced position where its upper surface lies at any level from above the base of the mold to the top of the mold.

31 Claims, 5 Drawing Sheets

(56) References Cited

U.S. PATENT DOCUMENTS

| | | | | |
|---|---|---|---|---|
| 2,341,499 | A | * | 2/1944 | Cunningham ............... 264/330 |
| 2,512,092 | A | * | 6/1950 | Dike et al. .................... 425/255 |
| 2,528,084 | A | * | 10/1950 | Sand ............................ 425/424 |
| 3,781,156 | A | * | 12/1973 | Moore .......................... 425/424 |
| 3,859,018 | A | * | 1/1975 | Gugler ....................... 425/126.1 |
| 4,385,025 | A | * | 5/1983 | Salerno et al. ................ 264/255 |
| 4,980,115 | A | * | 12/1990 | Hatakeyama et al. ..... 264/328.7 |
| 5,695,699 | A | * | 12/1997 | Naritomi ..................... 264/46.4 |
| 6,214,399 | B1 | * | 4/2001 | Garbo .......................... 426/505 |
| 7,442,025 | B2 | * | 10/2008 | Rivera .......................... 425/193 |

FOREIGN PATENT DOCUMENTS

| | | |
|---|---|---|
| EP | 0865736 | 9/1998 |
| EP | 0914776 | 5/1999 |
| EP | 1759591 | 3/2007 |
| EP | 1825760 | 8/2007 |
| GB | 879828 | 10/1961 |

* cited by examiner

MOULDING OF CHOCOLATE

FIELD OF THE INVENTION

The present invention relates to an apparatus and method for moulding chocolate, more particularly to enable the manufacture of chocolate pieces or tablets having a core or cavity of virtually any two-dimensional shape passing through the thickness of the piece or tablet and which also enables a second material, such as white chocolate, to be deposited in the cavity.

BACKGROUND OF THE INVENTION

Chocolate tablets are very popular with consumers and traditionally have been in the form of simple moulded block shapes. There is an increasing demand for new chocolate shapes which add visual interest to the experience of enjoying chocolate tablets.

Moulding techniques and apparatus, such as those conventionally used for making moulded chocolate products, place significant limitations on the shape of product that may be obtained. In particular, it is not generally possible to mould a chocolate piece or tablet having a core or cavity passing through the thickness of the bar. When correctly tempered chocolate is placed into a tablet mould and cooled, it contracts. With a simple mould shape, this contraction aids the release of the solid chocolate tablet from the mould. To mould a tablet with a cavity passing through it, one might imagine that one could simply design the mould in such a way that there was a raised central section of the mould corresponding to the desired cavity. However, with such a mould, when the chocolate contracts it grips the central section and cannot readily be removed from the mould. This effect is similar to that observed when a blacksmith heats a metal band and places it around a wooden wheel and then cools the metal to grip the wheel. Chocolate demoulding problems are worse with thin chocolate tablets as they lack the necessary weight relative to surface area to fall out of an inverted mould under gravity.

We have devised an apparatus and process for the manufacture of a chocolate piece or tablet having a core or cavity passing through the thickness of the piece or tablet whereby the above problems have been alleviated or overcome.

SUMMARY OF THE PRESENT INVENTION

According to the present invention there is provided an apparatus for the manufacture of a chocolate piece or tablet having a core or cavity passing through the thickness of the piece or tablet which comprises a mould comprising a surrounding wall and base, a central aperture having a predetermined cross-sectional shape passing through the base, and a former having a cross-sectional shape conforming to that of the central aperture adapted to reciprocate through the central aperture between a retracted position where its upper surface is level with the base of the mould to an advanced position where its upper surface lies at any level from above the base of the mould to the top of the mould.

DETAILED DESCRIPTION OF THE INVENTION

In the present invention the word "former" means an internal mould filling a space around which the chocolate can be moulded.

The chocolate piece or tablet may have any suitable shape, e.g. square, rectangular, circular, oval, star-shaped, polygonal, etc. It may have a maximum thickness of 25 mm, preferably less than 10 mm, preferably less than 7 mm, more preferably less than 5 mm. For instance the thickness may be from 2 to 10 mm and most preferably from 2 to 4 mm.

The core or cavity may extend through part or the whole of the thickness of the chocolate piece or tablet and may have substantially any two-dimensional cross-sectional shape, from simple geometric, e.g. square, rectangular, circular, oval, star-shaped, cruciform, polygonal, etc. to complex and intricate, for example heart-shape or leaf veins. The core is preferably made of a different material which contrasts with the material of the chocolate piece or tablet, e.g. with regard to appearance, colour, flavour or texture, etc.

The configuration of the mould conveniently conforms to the external shape and size of the final chocolate piece or tablet. The base of the mould may conveniently be flat but, if desired, it may have a convex, concave or other contoured shape. The cross-sectional shape of the former conforms to the cross-sectional shape of the core or cavity of the chocolate piece or tablet. The former may, if desired, be stepped having a series of offsets or parts, for instance, so that its cross-sectional area increases from one end to the other.

The mould may be made of metal but is preferably made of plastics material, especially polycarbonate. Plastics material is preferred because it is lighter and less noisy.

The former may be made of metal, ceramic or plastics material or a flexible material such as silicone rubber. When the former is made of a flexible material, means may be provided to enable it to be stiffened in the advanced position and to be flexible as the retraction commences. Such a stiffening can be achieved by use of pneumatics to pressurize the flexible former from within, or by a mechanical stretcher coming from beneath.

Advantageously, the former is supported by a carrier adapted to reciprocate and which is fitted to the underside of the base of the mould. This carrier may be held in two positions; either retracted where the upper surface of the former is level with the base of the mould or advanced with the former inserted through the central aperture of the base of the mould, where its upper surface lies at any level from above the base of the mould to the top of the mould.

Conveniently, a cam or pneumatic mechanism enables the reciprocating movement of the former, preferably by acting on the carrier which supports the former.

The mould may be provided with a frame through which the carrier reciprocates. The frame comprises upper and lower walls and a surrounding wall. Advantageously, the base of the mould acts as the upper wall of the frame.

A holding system is conveniently provided to keep the former in the advanced or retracted position. This may be, for instance a physical latch mechanism. Another holding system may be provided by means of one or more steel inserts in both the upper wall and lower wall of the frame and one or more magnets positioned in the carrier which act alternately on the steel inserts in the mould frame to hold the carrier in either of its two positions thereby keeping the former in the advanced or retracted position.

In one embodiment of the invention the former may be slightly angled so as to provide a release angle and prevent the retraction of the former causing scuff marks on the chocolate. In contrast with release angles (sometimes called draft angles) on normal chocolate mould, which are typically greater than about 7 degrees, the release angle can be smaller, especially if a positive action is applied to withdraw the former from the mould. Release angles as small as 2 degrees can be used and even no release angle at all is possible where scuff marks on the chocolate will not be visible.

If desired, a plurality of formers can be mounted on one carrier for use in an array of cavities in one mould.

The surrounding wall of the mould is conveniently fixed to the base whereby its inner lower surface is level with the base. In another embodiment, surrounding wall of the mould may be adapted to reciprocate between an advanced position and a retracted position simultaneously with retraction of the former. The retraction of the surrounding wall of the mould may take place laterally from its advanced position where its inner lower surface is level with the base and in contact with the base to a position remote from the base. However, in a preferred embodiment, the retraction of the surrounding wall of the mould may take place in the same direction as the retraction of the former from its advanced position in contact with the base where its inner lower surface is level with the base to a position where its upper surface is level with the base. This latter embodiment further aids the removal of the chocolate tablet from the mould, especially for thinner products, as with both the former and the surrounding wall retracted the tablet can be slid sideways out of the mould.

The present invention also provides a process for the manufacture of a chocolate piece or tablet having a cavity extending through part or all the thickness of the piece or tablet wherein chocolate is deposited in a mould comprising a surrounding wall and base conforming to the external shape and size of the chocolate piece or tablet, a central aperture having a predetermined cross-sectional shape passing through the base, and a former having a cross-sectional shape conforming to that of the central aperture adapted to reciprocate through the central aperture between a retracted position where its upper surface is level with the base of the mould to an advanced position where its upper surface lies at any level from above the base of the mould to the top of the mould which comprises advancing the former to its advanced position, depositing the chocolate in the mould, advantageously vibrating the mould to ensure an even fill with no air bubbles, scraping-off excess chocolate (if any), cooling, retracting the former to its retracted position, inverting the mould and ejecting the chocolate piece or tablet having a cavity extending through part or all the thickness of the piece or tablet.

It should be understood that the cavity fills the space in the deposited chocolate formerly occupied by the former in its advanced position when the former has returned to its retracted position. When the former is advanced to a position where its upper surface lies at the top of the mould, then when the chocolate is deposited in the mould, the cavity extends through all the thickness of the piece or tablet when the former has returned to its retracted position. When the former is advanced to a position where its upper surface lies at any intermediate level from above the base of the mould to the top of the mould, then when the chocolate is deposited in the mould, it fills the space immediately above the upper surface of the former leaving a cavity in the space formerly occupied by the former in its advanced position when the former has returned to its retracted position.

The present invention also provides a process for the manufacture of a chocolate piece or tablet having a core of a different material extending through part or all the thickness of the piece or tablet wherein chocolate is deposited in a mould comprising a surrounding wall and base conforming to the external shape and size of the chocolate piece or tablet, a central aperture having a predetermined cross-sectional shape passing through the base, and a former having a cross-sectional shape conforming to that of the central aperture adapted to reciprocate through the central aperture between a retracted position where its upper surface is level with the base of the mould to an advanced position where its upper surface lies at any level from above the base of the mould to the top of the mould which comprises advancing the former to its advanced position, depositing the chocolate in the mould, scraping-off excess chocolate (if any), cooling, retracting the former to its retracted position, to form a chocolate piece or tablet having a cavity extending through part or all the thickness of the piece or tablet, depositing a different material in the cavity, advantageously vibrating the mould to ensure an even fill with no air bubbles, scraping-off excess chocolate (if any), scraping-off excess different material (if any), solidifying the different material, inverting the mould and ejecting the chocolate piece or tablet having a core of the said different material extending through part or all the thickness of the piece or tablet.

It should be understood that the different material forming the core fills the space of the cavity in the deposited chocolate which corresponds to the space formerly occupied by the former in its advanced position. When the cavity extends through all the thickness of the piece or tablet before the different material is deposited, then after deposition, the different material forming the core extends through all the thickness of the piece or tablet. When the cavity extends through only part of the thickness of the piece or tablet before the different material is deposited, then after deposition, the different material forming the core only extends through that part of the thickness of the piece or tablet which formed the cavity corresponding to the space formerly occupied by the former in its advanced position.

In one embodiment of the invention, the chocolate deposited in the mould contains a filling completely enclosed by the chocolate and this applies whether the chocolate piece or tablet has either a core or a cavity passing through the thickness of the piece or tablet. In this embodiment, the chocolate and the filling are co-deposited into the mould. This may be achieved, for example, by using a "one-shot" depositor well known to those skilled in the art where an outer chocolate shell and an inner filling are deposited at the same time such that the filling is enclosed by the chocolate. A one-shot process is described in "Chocolate, Cocoa and Confectionery" by Bernard W. Minifie, Third Edition, 1989, published by Van Nostrand Reinhold, page 203 under the name "The Westal SCB Process", in EP-A-0865736 and in EP-A-1825760. Conventionally the one-shot process utilizes a one-shot depositor having two concentric nozzles, an inner and an outer nozzle. The outer nozzle is connected to the chocolate supply and the inner nozzle is connected to the filling supply. During the production of the filled product, the depositor first discharges the chocolate shell material, then the chocolate shell together with the filling material and finally just the chocolate in rapid succession (i.e., essentially simultaneously), into empty cavities of a mold so that the chocolate material forms the outer shell with the filling material completely enclosed therein. Typical filling materials that may be used are water-based fillings and fat-based fillings (e.g., sugar fillings, chocolate fillings, caramel fillings, and the like). When used in this invention, the one-shot nozzles need to be arranged such that they are directed into the region of the mould surrounding the former. Preferably the one shot depositor nozzle is modified to deposit the chocolate and filling in co-axial rings surrounding the former. For example, the modified one-shot depositor may comprise four concentric pipes. The inner pipe has the smallest diameter, is empty and is positioned over the former. One chocolate stream flows in the space between the inner pipe and the next larger diameter pipe, the filling material flows in the space between that pipe and the next larger diameter pipe and another chocolate stream flows in the space between the outer two pipes. As in the conventional one-shot process, in each deposit the chocolate flows start first, are then joined by the flow of the filling and then just chocolate completes the deposit. This results in an annular deposit of chocolate and filling, where the filling is enclosed within the chocolate.

In both the above processes, the former may conveniently be advanced or retracted by a cam or pneumatic mechanism, for instance by acting on the carrier.

The ejection of the chocolate piece or tablet may be aided by twisting the mould, e.g. in a well known manner such as by using a cam mechanism, or after inverting the mould by hitting with a mechanical hammer or vibrating the mould.

After ejecting the chocolate piece or tablet, the former may be repositioned to its advanced position where its upper surface lies at an appropriate level from above the base of the mould to the top of the mould, and the mould inverted back to its original position This may be done at some appropriate position in the moulding plant so that it is ready for another cycle through the plant.

The ejection the chocolate piece or tablet having a core of a different material passing through part or all the thickness of the piece or tablet may be carried out with the aid of the former being repositioned to its advanced position where its upper surface is level with the top of the mould. This enables the mould to be ready for another cycle through the plant.

The term "chocolate" in this invention includes dark, milk or white chocolate or a fat containing confectionery material derived from sugar with or without milk derived components, and fat and solids from vegetable or cocoa sources in differing proportions. The term "chocolate" should not be interpreted herein as being limited exclusively to compositions which can be called chocolate within the meaning of the standards for food products which are in force in some countries. The term chocolate used herein should therefore be interpreted as including any product or substance having rheological characteristics similar or substantially comparable to those of chocolate. Such a product may include chocolate substitutes containing direct cocoa butter replacements, stearines, coconut oil, palm oil, butter or any mixture thereof; nut pastes such as peanut butter and fat; praline; confectioner's coatings also known as compound or couvertures, used for covering ice cream or cakes usually comprising chocolate analogues with cocoa butter replaced by a cheaper nontempering fat; or "Caramac" sold by Nestle comprising non-cocoa butter fats, sugar and milk. In addition, chocolate products containing up to 90% water are also included such as the water-containing chocolate emulsions described in EP-A-1759591.

This invention facilitates the manufacture of thin chocolate products with a variety of shapes with the feature of a hole or cavity extending through part or the full thickness of the piece, of substantially any two-dimensional shape, from simple geometric to complex and intricate, for example heart-shape or leaf veins. In addition, this invention enables the hole or cavity to be filled with a core of a different product, giving a contrasting visual appeal, texture or taste if required. Suitable different products used as the core should be able to flow into the cavity at the moment of deposition, but then become sufficiently viscous to remain in the cavity without flowing out, for example a product which solidifies on cooling or drying. Examples of different products suitable for the core include a contrasting coloured chocolate, a praline, a fat-based cream or a stiff fondant.

The present invention also provides a chocolate piece or tablet having a core of a different material extending through the whole thickness of the piece or tablet.

The thickness of the chocolate piece or tablet may conveniently be less than 25 mm, preferably less than 10 mm, preferably less than 7 mm, more preferably less than 5 mm, for example from 2 mm to 10 mm, preferably from 4 to 9 mm, and most preferably from 2 to 4 mm.

The present invention also provides a chocolate piece or tablet having a cavity extending through the whole thickness of the piece or tablet, whose cross-sectional area increases stepwise from one end to the other.

One method of producing such a product by a process of the present invention involves using a stepped former whose cross-sectional area increases from one end to the other.

The present invention further provides a chocolate piece or tablet having a cavity extending through the whole thickness of the piece or tablet which comprises a plurality of chocolate pieces or tablets each with a different sized cavity stacked one on top of the other. For instance, the cross-sectional area of the cavity increases stepwise from one end to the other.

A method of producing such a product involves preparing a plurality of chocolate pieces or tablets according to the invention each with a different sized cavity and stacking them one on top of the other, for instance, so that the cross-sectional area of the cavity increases stepwise from one end to the other. Another embodiment of the invention provides a chocolate piece or tablet having a discontinuous series of cavities through the thickness of the piece or tablet which comprises a plurality of chocolate pieces or tablets each with a cavity stacked one on top of the other but where the cavities are not necessarily aligned, e.g. they may be staggered in relation to one another. The cavities may have the same or different sizes.

In another embodiment of the invention the chocolate surrounding the cavity encloses a filling. Such a product may be produced by a process of the present invention whereby chocolate and a filling are deposited into the mould using a one-shot depositor as described above.

The present invention also provides a chocolate piece or tablet having a core of a different material extending through part or all the thickness of the piece or tablet, whose cross-sectional area increases stepwise from one end to the other.

Such a product may be produced by a process of the present invention whereby the different material forming the core may be deposited in the stepped cavity through part or all of the thickness of the piece or tablet wherein the stepped former is advanced to a position where its upper surface lies at any intermediate stepped level from above the base of the mould to the top of the mould.

Another method of producing such a product by a process of the present invention involves preparing a plurality of chocolate pieces or tablets each with a different sized cavity one or more of which has a core of a different material, and stacking them one on top of the other so that the cross-sectional area of the cavity increases stepwise from one end to the other.

One example of such a product is a chocolate piece or tablet having a core of a different material having a contrasting colour occupying the cavity having the smallest cross-sectional area.

The chocolate pieces or tablets of the present invention may deliver a multi-sensorial enjoyment, being attractive visually and providing the pleasure of a thin tablet combined with the indulgence of a filled tablet.

The present invention is further illustrated with reference to the accompanying drawing in which FIG. 1 represents a transverse section of a mould according to the invention, FIG. 2 represents a schematic flow diagram of a process for the manufacture of a hollow chocolate piece or tablet having a cavity passing through the full thickness, FIG. 3 represents a schematic flow diagram of a process for the manufacture of a chocolate piece or tablet having a core passing through the full thickness of the piece or tablet, and FIG. 4 represents a chocolate piece or tablet comprising a plurality of chocolate pieces or tablets each with a different sized cavity stacked one on top of the other.

Figure 1:
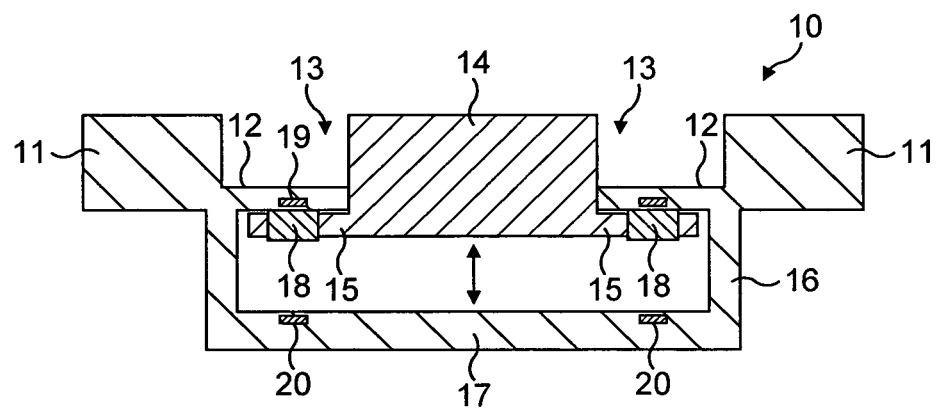

FIG. 1 shows a mould (10) comprising a circular surrounding wall (11) and a base (12) provided with a central aperture (not shown) having a cross-section in the shape of a heart enclosing an empty space (13) into which chocolate will be introduced. A central former (14) having a cross-section in the shape of a heart conforming to that of the aperture supported by a carrier (15) adapted to reciprocate through the aperture in the direction of the arrows is positioned in an advanced position where its upper surface is level with the top of the mould. The mould is also provided with a frame in which the base of the mould (12) acts as the upper wall and which comprises a surrounding side wall (16) and a lower wall (17). Magnets (18) are fitted in the carrier (15) and steel inserts (19, 20) are positioned in the upper and lower walls of the frame.

Figure 2A:
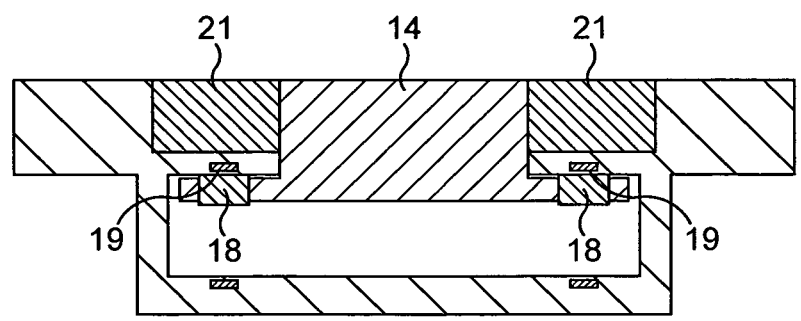
Figure 2B:
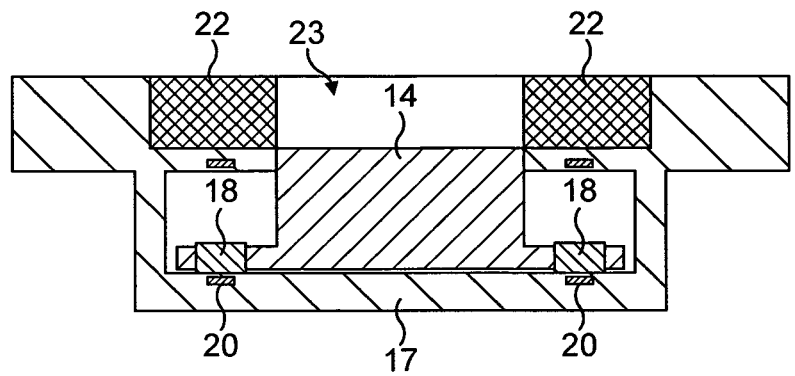
Figure 2C:
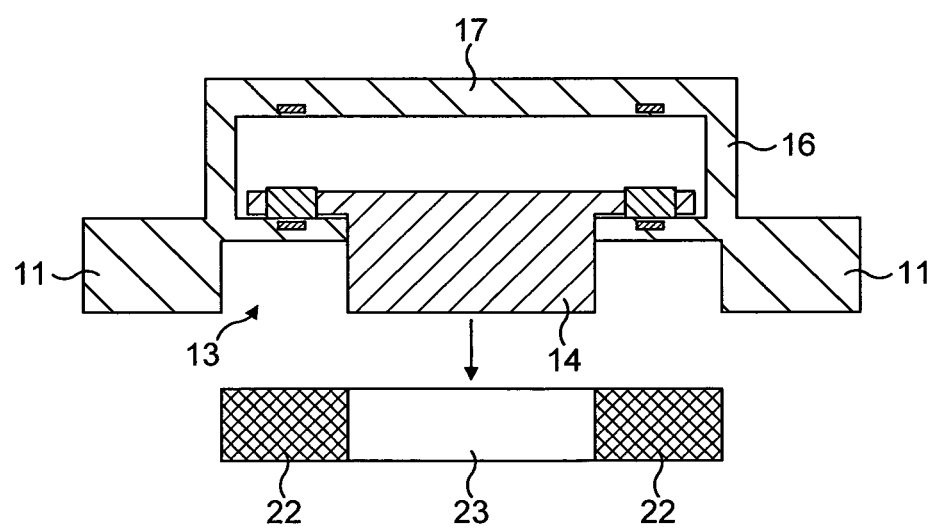
Figure 3A:
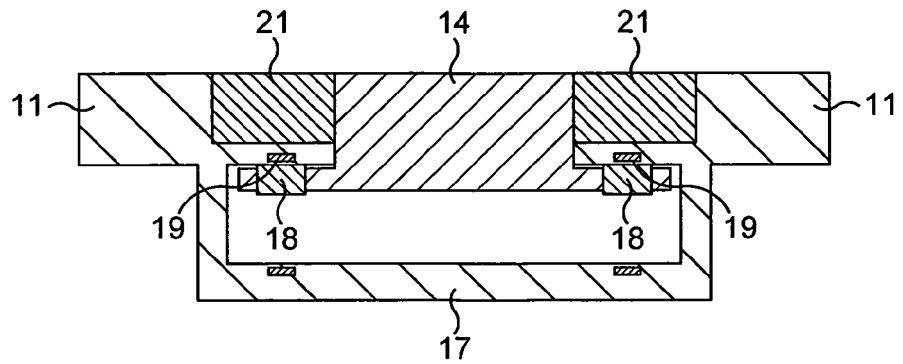
Figure 3B:
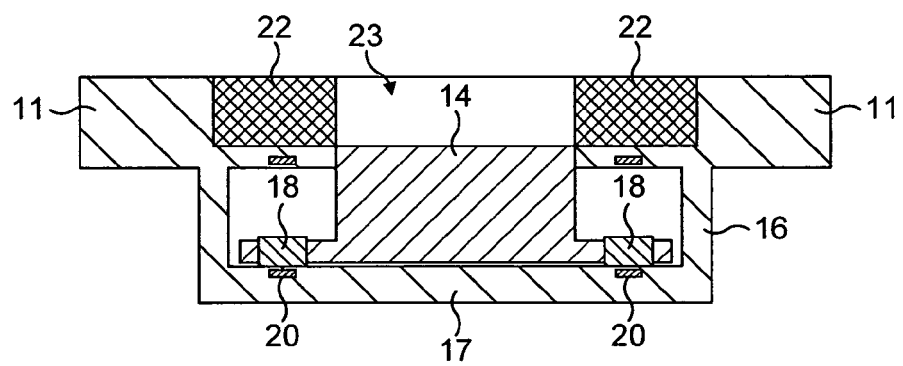
Figure 3C:
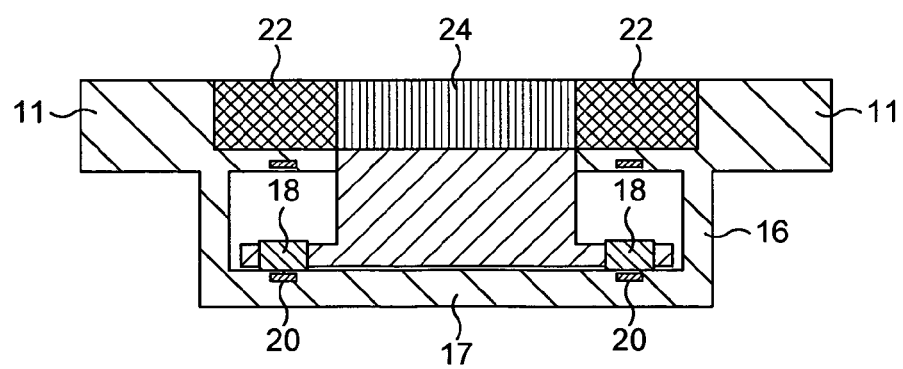
Figure 3D:
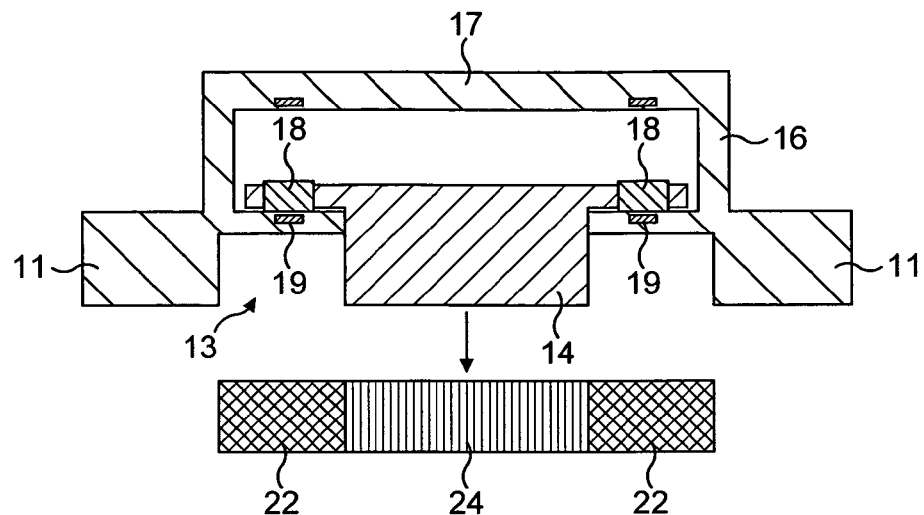

For the manufacture of a hollow chocolate piece or tablet having a cavity passing through the full thickness as shown in FIG. 2, FIG. 2 (a) shows the mould (10) of FIG. 1 with the central former (14) in an advanced position where its upper surface is level with the top of the mould and held in position by the magnets (18) acting on the steel inserts (19) in the upper wall (12) of the frame. The empty space (13) is filled with molten chocolate (21) and then excess chocolate is backed off and cooled.

As shown in FIG. 2 (b), the molten chocolate (21) has cooled to give a solidified chocolate (22) and the central former (14) is lowered into its retracted position by a cam mechanism (not shown) where its upper surface is level with the base of the mould and held in position by the magnets (18) acting on the steel inserts (20) in the lower wall (17) of the frame leaving a central cavity (23) enclosed by the chocolate (22).

The mould is twisted by mechanical cams and then inverted in which position the hollow chocolate piece (22) with a central cavity (23) is ejected as shown in FIG. 2 (c) by the central former (14) returning to its advanced position reforming the empty space (13) enclosed by the circular surrounding wall (11) of the mould. The mould is then inverted again to the position shown in FIG. 2 (a) where the cycle recommences with further chocolate being filled into the empty space (13).

For the manufacture of a chocolate piece or tablet having a core passing through the full thickness of the piece or tablet as shown in FIG. 3, FIG. 3 (a) shows the mould (10) of FIG. 1 with the central former (14) in an advanced position where its upper surface is level with the top of the mould and held in position by the magnets (18) acting on the steel inserts (19) in the upper wall (12) of the frame. The empty space (13) is filled with molten chocolate (21) and then excess chocolate is backed off and cooled.

As shown in FIG. 3 (b), the molten dark chocolate (21) has cooled to give a solidified chocolate (22) and the central former (14) is lowered into its retracted position by a cam mechanism (not shown) where its upper surface is level with the base of the mould and held in position by the magnets (18) acting on the steel inserts (20) in the lower wall (17) of the frame leaving a central cavity (23) enclosed by the chocolate (22).

FIG. 3 (c) shows the central cavity (23) filled with molten white chocolate (24) and excess white chocolate is backed off and cooled to solidify it.

The mould is twisted and then inverted in which position the dark chocolate piece (22) with a central core of white chocolate (24) is ejected as shown in FIG. 3 (d) by the central former (14) returning to its advanced position reforming the empty space (13) enclosed by the circular surrounding wall (11) of the mould. The mould is then inverted again to the position shown in FIG. 3 (a) where the cycle recommences with further chocolate being filled into the empty space (13).

Figure 4:
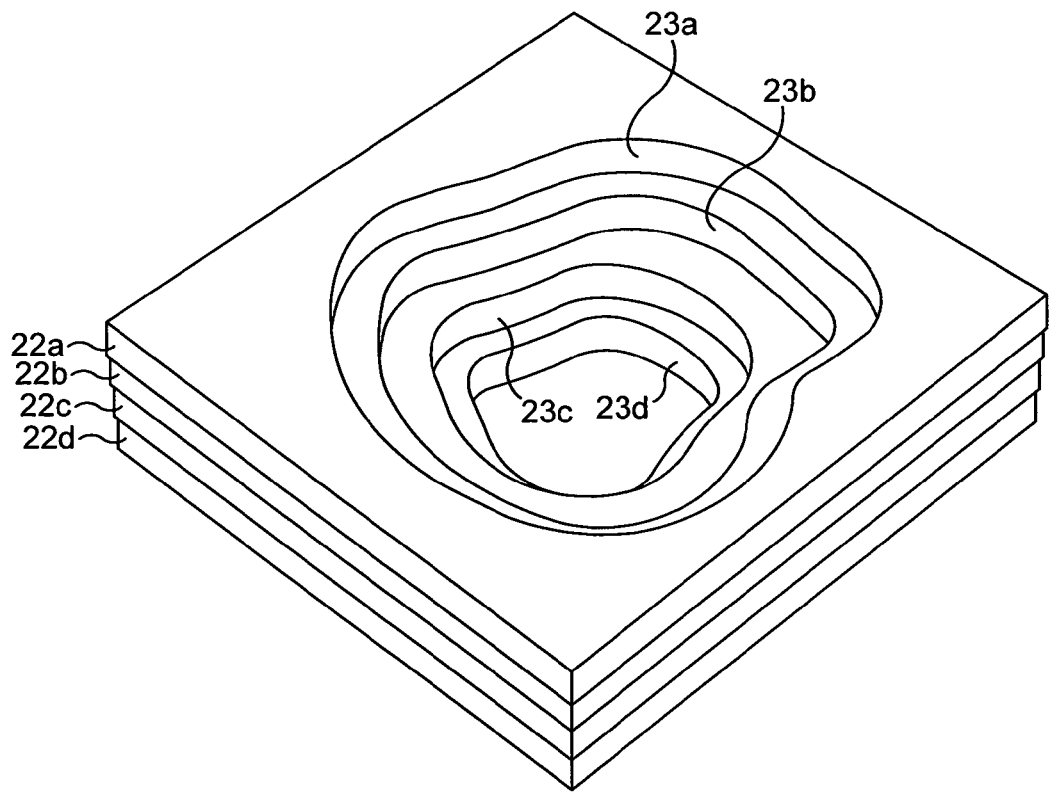

FIG. 4 shows a chocolate piece or tablet comprising a plurality of chocolate pieces or tablets (22a, 22b, 22c, and 22d) each with a different sized cavity (23a, 23b, 23c and 23d) stacked one on top of the other which produces an attractive perspective effect.

Figure 5:
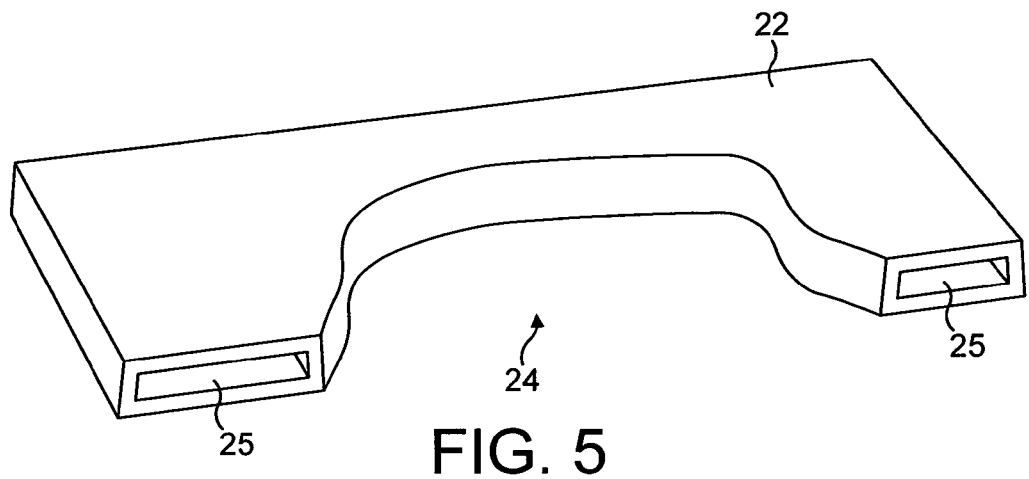
FIG. 5 represents a cross section of part of a chocolate piece or tablet having a core passing through the full thickness of the piece or tablet where the chocolate encloses a filling.

FIG. 5 shows part of a chocolate piece or tablet (22) having a core (24) passing through the full thickness of the piece or tablet where the chocolate encloses a filling (25).

Figure 6:
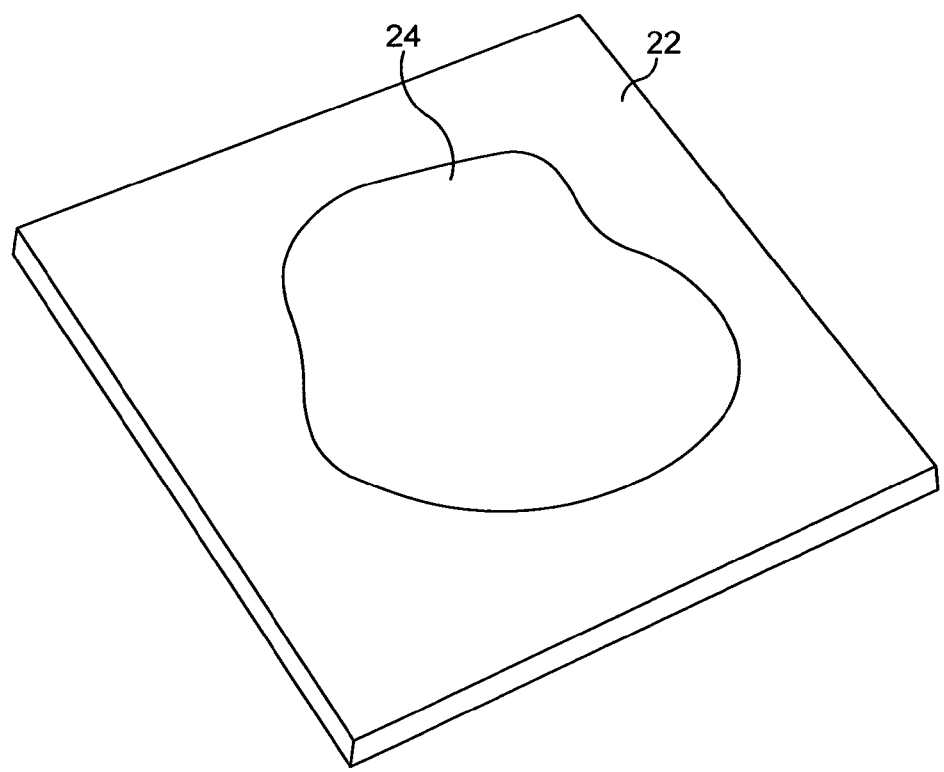
FIG. 6 represents a chocolate piece or tablet having a core of a different material extending through the whole thickness of the piece or tablet.

FIG. 6 shows a chocolate piece or tablet (22) having a core (24) of a different material extending through the whole thickness of the piece or tablet.

The invention claimed is:

1. An apparatus for the manufacture of a chocolate piece or tablet having a core or cavity that extends through a thickness of the piece or tablet comprising a mold comprising a surrounding wall and base, a central aperture having a predetermined cross-sectional shape extending through a base, and a former having a cross-sectional shape conforming to that of the central aperture and being adapted to reciprocate through the central aperture between a retracted position where an upper surface of the former is level with the base of the mold to an advanced position where the upper surface lies at any level from above the base of the mold to a top of the mold.

2. An apparatus according to claim 1 wherein the mold has a shape that previously presented to a final external shape and size of the chocolate piece or tablet.

3. An apparatus according to claim 1 wherein the former has a cross-sectional shape conforming to a cross-sectional shape of the core or cavity of the chocolate piece or tablet.

4. An apparatus according to claim 1 wherein the former is stepped, having a series of offsets or parts so that its cross-sectional area increases from one end to another end.

5. An apparatus according to claim 1 wherein the former is supported by a carrier that is adapted to reciprocate and which is fitted to an underside of the base of the mold.

6. An apparatus according to claim 5 wherein a cam or pneumatic mechanism enables the reciprocating movement of the carrier.

7. An apparatus for the manufacture of a chocolate piece or tablet having a core or cavity that extends through a thickness of the piece or tablet, the apparatus comprising:
a mold comprising a surrounding wall and base, a central aperture having a predetermined cross-sectional shape extending through a base; and
a former having a cross-sectional shape conforming to that of the central aperture and being adapted to reciprocate through the central aperture between a retracted position where an upper surface of the former is level with the base of the mold to an advanced position where the upper surface lies at any level from above the base of the mold to a top of the mold, the former being supported by a carrier that is adapted to reciprocate and which is fitted to an underside of the base of the mold, and the mold being provided with a frame comprising a surrounding wall and upper and lower walls between which the carrier reciprocates.

8. An apparatus according to claim 1 wherein a holding system is provided to maintain the former in the advanced or retracted position.

9. An apparatus for the manufacture of a chocolate piece or tablet having a core or cavity that extends through a thickness of the piece or tablet, the apparatus comprising:
   a mold comprising a surrounding wall and base, a central aperture having a predetermined cross-sectional shape extending through a base; and
   a former having a cross-sectional shape conforming to that of the central aperture and being adapted to reciprocate through the central aperture between a retracted position where an upper surface of the former is level with the base of the mold to an advanced position where the upper surface lies at any level from above the base of the mold to a top of the mold, a holding system provided to maintain the former in the advanced or retracted position, and the holding system comprising a physical latch mechanism.

10. An apparatus for the manufacture of a chocolate piece or tablet having a core or cavity that extends through a thickness of the piece or tablet, the apparatus comprising:
    a mold comprising a surrounding wall and base, a central aperture having a predetermined cross-sectional shape extending through a base; and
    a former having a cross-sectional shape conforming to that of the central aperture and being adapted to reciprocate through the central aperture between a retracted position where an upper surface of the former is level with the base of the mold to an advanced position where the upper surface lies at any level from above the base of the mold to a top of the mold, a holding system provided to maintain the former in the advanced or retracted position, and the holding system comprising at least one steel insert in both an upper wall and a lower wall of the frame and at least one magnet positioned in the carrier which acts on the steel insert in the mold frame to hold the carrier in either of two positions thereby keeping the former in the advanced or retracted position.

11. An apparatus according to claim 5 wherein a plurality of formers are mounted on one carrier for use in an array of cavities in one mold.

12. An apparatus according to claim 1 wherein the surrounding wall of the mold is fixed in contact with the base.

13. An apparatus for the manufacture of a chocolate piece or tablet having a core or cavity that extends through a thickness of the piece or tablet, the apparatus comprising:
    a mold comprising a surrounding wall and base, a central aperture having a predetermined cross-sectional shape extending through a base; and
    a former having a cross-sectional shape conforming to that of the central aperture and being adapted to reciprocate through the central aperture between a retracted position where an upper surface of the former is level with the base of the mold to an advanced position where the upper surface lies at any level from above the base of the mold to a top of the mold, and the surrounding wall of the mold being adapted to reciprocate laterally between an advanced position in contact with the base and a retracted position remote from the base simultaneously with retraction of the former.

14. A process for the manufacture of a chocolate piece or tablet having a cavity extending through a part or all of a thickness of the piece or tablet comprising:
    providing a mold comprising a surrounding wall and base conforming to the external shape and size of the chocolate piece or tablet, a central aperture having a predetermined cross-sectional shape extending through the base, and a former having a cross-sectional shape conforming to that of the central aperture and being adapted to reciprocate through the central aperture between a retracted position where an upper surface of the former is level with the base of the mold to an advanced position where the upper surface lies at any level from above the base of the mold to a top of the mold;
    advancing the former to its advanced position; and
    depositing the chocolate in the mould, retracting the former to its retracted position, inverting the mould and ejecting the chocolate piece or tablet having a cavity extending through part or all the thickness of the piece or tablet.

15. A process for the manufacture of a chocolate piece or tablet having a core of a different material extending through a part or all of a thickness of the piece or tablet comprising:
    providing a mold comprising a surrounding wall and base conforming to the external shape and size of the chocolate piece or tablet, a central aperture having a predetermined cross-sectional shape extending through the base, and a former having a cross-sectional shape conforming to that of the central aperture and being adapted to reciprocate through the central aperture between a retracted position where an upper surface of the former is level with the base of the mold to an advanced position where the upper surface lies at any level from above the base of the mold to a top of the mold;
    advancing the former to its advanced position;
    depositing the chocolate in the mold;
    retracting the former to its retracted position, to form a chocolate piece or tablet having a cavity extending through a part or all of the thickness of the piece or tablet;
    depositing a different material in the cavity;
    backing-off excess different material;
    inverting the mold; and
    ejecting the chocolate piece or tablet having a core of the different material extending through a part or all of the thickness of the piece or tablet.

16. A process according to claim 14 wherein the former is stepped with its cross-sectional area increasing from one end to the other.

17. A process according to claim 14 wherein the former is advanced or retracted by a cam or pneumatic mechanism.

18. A process according to claim 14 wherein the ejection of the chocolate piece or tablet is performed with the aid of the former being repositioned to its advanced position where its upper surface is level with the top of the mold.

19. A process for the manufacture of a chocolate piece or tablet according to claim 14 wherein chocolate is deposited in the mold together with a filling which is completely enclosed by the chocolate.

20. A process according to claim 19 wherein the chocolate and the filling are co-deposited into the mold by means of a "one-shot" depositor modified so that the one-shot nozzles are directed into a region of the mold surrounding the former to deposit the chocolate and filling in co-axial rings in the mold surrounding the former.

21. A process according to claim 18 wherein the surrounding wall of the mold is retracted at the same time as the former.

22. A process according to claim 21 wherein the retraction of the surrounding wall of the mold takes place laterally from its advanced position where an inner lower surface is level with the base and in contact with the base to a position remote from the base.

23. A process according to claim 21 wherein the retraction of the surrounding wall of the mold takes place in a same direction as the retraction of the former from its advanced position in contact with the base where the inner lower surface is level with the base to a position where the upper surface is level with the base.

24. A process according to claim 15 wherein the former is stepped with its cross-sectional area increasing from one end to the other.

25. A process according to claim 15 wherein the former is advanced or retracted by a cam or pneumatic mechanism.

26. A process according to claim 15 wherein the ejection of the chocolate piece or tablet is performed with the aid of the former being repositioned to its advanced position where its upper surface is level with the top of the mold.

27. A process for the manufacture of a chocolate piece or tablet according to claim 14 wherein chocolate is deposited in the mold together with a filling which is completely enclosed by the chocolate.

28. A process according to claim 27 wherein the chocolate and the filling are co-deposited into the mold by means of a "one-shot" depositor modified so that the one-shot nozzles are directed into a region of the mold surrounding the former to deposit the chocolate and filling in co-axial rings in the mold surrounding the former.

29. A process according to claim 26 wherein the surrounding wall of the mold is retracted at the same time as the former.

30. A process according to claim 29 wherein the retraction of the surrounding wall of the mold takes place laterally from its advanced position where an inner lower surface is level with the base and in contact with the base to a position remote from the base.

31. A process according to claim 29 wherein the retraction of the surrounding wall of the mold takes place in a same direction as the retraction of the former from its advanced position in contact with the base where the inner lower surface is level with the base to a position where the upper surface is level with the base.

* * * * *